US006169668B1

(12) United States Patent
Clayton

(10) Patent No.: US 6,169,668 B1
(45) Date of Patent: Jan. 2, 2001

(54) ZERO VOLTAGE SWITCHING ISOLATED BOOST CONVERTERS

(75) Inventor: Paul S. Clayton, Santa Clara, CA (US)

(73) Assignee: Space Systems/Loral, Inc., Palo Alto, CA (US)

( * ) Notice: Under 35 U.S.C. 154(b), the term of this patent shall be extended for 0 days.

(21) Appl. No.: 09/427,879

(22) Filed: Oct. 27, 1999

(51) Int. Cl.[7] .......................... H02M 3/335; H02M 7/538
(52) U.S. Cl. ................................. 363/26; 363/133
(58) Field of Search .................................... 363/16, 24, 25, 363/26, 78, 79, 97, 133, 134

(56) References Cited

U.S. PATENT DOCUMENTS

| 4,893,227 | * | 1/1990 | Gallios et al. | 363/26 |
| 5,510,974 | * | 4/1996 | Gu et al. | 363/134 |
| 5,867,379 | * | 2/1999 | Maksimovic et al. | 363/89 |

* cited by examiner

Primary Examiner—Jessica Han

(74) Attorney, Agent, or Firm—Kenneth W. Float

(57) ABSTRACT

Zero voltage switching isolated boost converters that provide high efficiency power conversion between input and output DC voltages. The boost converters includes a voltage amplifying stage including first and second switching transistors, an input coupled inductor, and an output transformer. The voltage amplifying stage amplifies the DC input voltage which is transformed by the output transformer to produce the DC output voltage. A zero voltage control input circuit is coupled to gates of the switching transistors and to the output of the voltage amplifying stage. The input circuit generates synchronization signals that synchronize rising edges of gate drive signals applied to the switching transistors with a resonant circuit. This is achieved by observing the state of gate and drain voltages of the switching transistors and detecting the moment when both drains are low, and both gates are not high. First and second pulsewidth modulators are coupled to the gates of the switching transistors that sense current flowing through the switching transistors and generate falling edges of the gate drive signals that drive the gates of the switching transistors in response to an output voltage error signal and the sensed switch current.

10 Claims, 7 Drawing Sheets

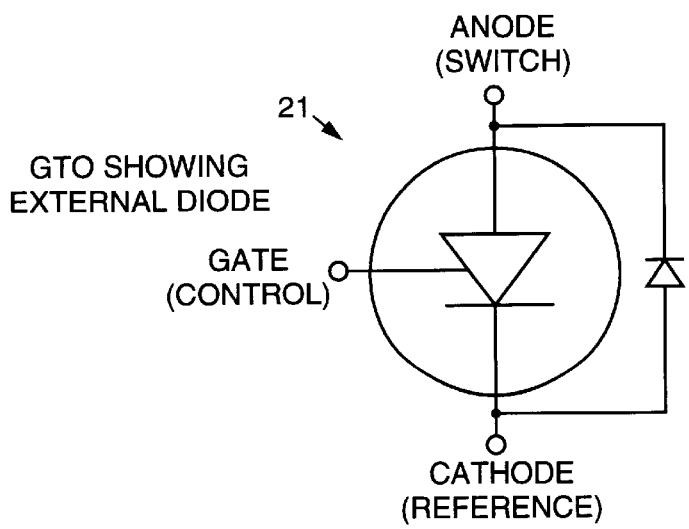
Fig. 6d
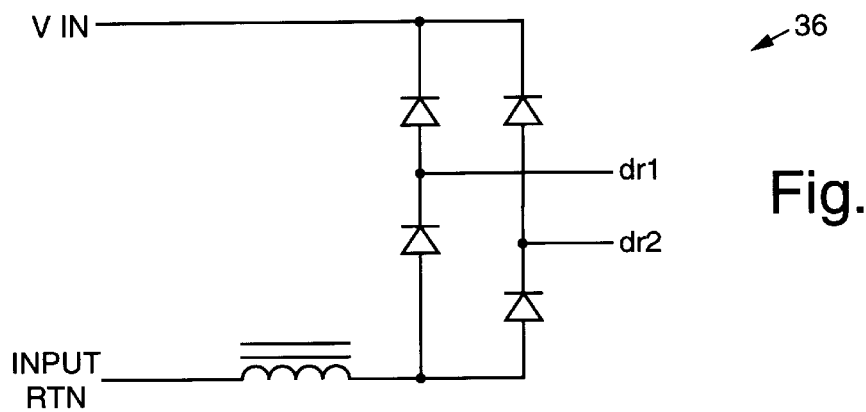
Fig. 7
Fig. 8
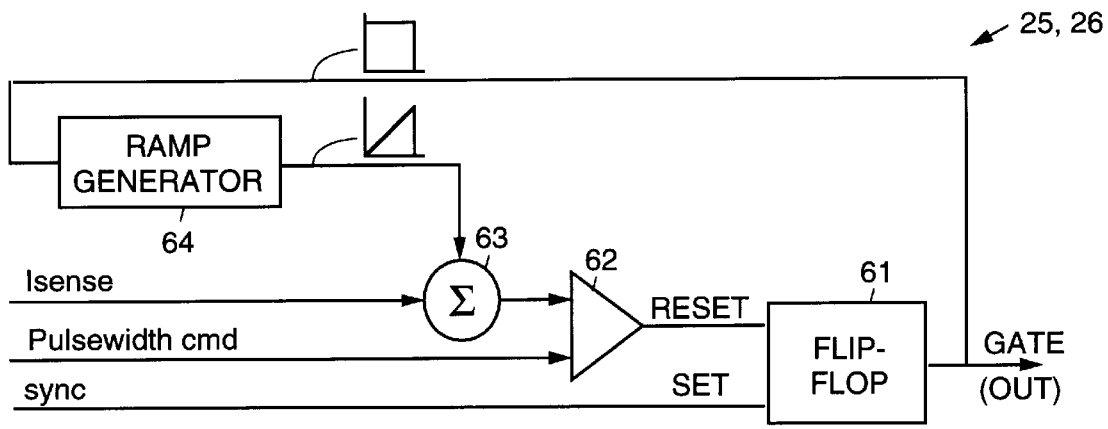

ZERO VOLTAGE SWITCHING ISOLATED BOOST CONVERTERS

BACKGROUND

The present invention relates generally to boost converters, and more particularly, to zero voltage switching isolated boost converters.

Hard switching Weinberg converters have achieved the nearest comparable performance to the present invention. These converters have a power stage, which is topologically identical to the present invention. The difference between the two is in the control methodology and the turns ratios in the transformer and inductor. Efforts to reduce power losses in the Weinberg converter have been centered on reducing conduction losses by using more and larger MOSFETs (Metal Oxide Semiconductor Field Effect Transistors) as the switching devices, and increasing the size and interleaving of the transformer and coupled inductor. These measures have the effect of increasing the energy stored in the parasitic capacitances of the MOSFETs and transformer and inductor windings. This energy is dissipated during each switching transition, and the additional switching loss sets a lower limit on the power loss which can be obtained using the hard switching Weinberg converter and similar approaches.

There are also a number of other zero voltage switching converters currently in use. A typical zero voltage switching full bridge voltage fed buck converter is described in application note U136A published by Unitrode. The Unitrode circuit uses the magnetizing current of a transformer to produce resonant transitions and zero voltage switching.

The Unitrode circuit passes input current through two transistors and operates each transistor at less than 50 percent duty, compared to one transistor operating at greater than 50 percent duty in the zero voltage switching boost converter of the present invention. This causes the prior art full-bridge buck converter to have higher $I^2R$ losses than the zero voltage switching boost converter of the present invention.

The prior art circuit has losses due to transformer leakage inductance that are minimal compared to the present invention, however, because in a full bridge topology, leakage energy can be easily returned to the source. The present zero voltage switching boost converter requires tightly coupled magnetics to achieve high efficiency, because its leakage transients must be limited by a voltage clamp circuit.

Accordingly, it is an objective of the present invention to provide for improved zero voltage switching isolated boost converters.

SUMMARY OF THE INVENTION

To accomplish the above and other objectives. the present invention provides for improved zero voltage switching isolated boost converters. The zero voltage switching isolated boost converters provide high efficiency power conversion between input and output DC voltages. A first embodiment of the boost converter employs phase-locked loop control approach, while a second embodiment employs a time domain control approach.

The present boost converters use a resonant circuit to achieve soft (zero voltage) switching transitions in an isolated boost topology. The combination of zero voltage switching and the isolated boost topology minimizes both switching and $I^2R$ losses.

In general, the zero voltage switching boost converters comprise a voltage amplifying stage having first and second switching transistors, an input coupled inductor, and an output transformer. The voltage amplifying stage amplifies a DC input voltage to produce a higher DC output voltage higher than the product of the DC input voltage and the output transformer turns ratio. The resonant circuit comprises the input inductor, the output transformer and the parasitic capacitances of the transistors, inductor, transformer and output rectifiers. External capacitors may also be added at these positions.

A zero voltage control input circuit is coupled to gates and drains of the switching transistors. The input circuit generates synchronization signals that synchronize the rising edge of the gate drive signals applied to the switching transistors with the resonant circuit by observing the state of gate and drain voltages of the switching transistors and detecting the moment when both drains are low, and both gates are not high.

First and second pulsewidth modulators are coupled to the gates of the switching transistors and to current sensors which sense current flowing through the switching transistors and also to the output of the isolation circuit and the output of the zero voltage control circuit. The pulsewidth modulators generate gate drive signals that drive the gates of the switching transistors in response to the synchronization signals generated by the zero voltage control input circuit, current flowing in the switching device, and the pulsewidth command signal from the isolation circuit.

Alternatively, the pulsewidths of the gate drives to the switching transistors may be controlled solely based on the signal from the error amplifier and isolation circuit and the synchronization signals, eliminating the need for current sensors.

The output of the voltage amplifying stage is coupled to the input of an error amplifier, along with the output of a voltage reference. The error amplifier output is analogous to the difference between the reference voltage and the output voltage of the voltage amplifying stage. The output of the error amplifier is coupled to the input of an isolation circuit, for applications in which isolation between input and output returns is needed. If isolation of the returns is not needed, the isolation circuit may be omitted. In this case, the positive output terminal is isolated from the positive input terminal, unlike a conventional boost converter. The output of the isolation circuit is coupled to the first and second pulsewidth modulators.

Although MOSFETs are shown as the switching devices in the drawing figures, other types of transistors or thyristors may be used, including, but not limited to, IGBTs (Insulated Gate Bipolar Transistors), BJTs (Bipolar Junction Transistors) or gate turnoff thyristors (GTOs). These devices require an anti-parallel diode, unlike the MOSFETS shown, which incorporate this device as a parasitic element.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 illustrates an alternative voltage clamp circuit to take the place of the dissipative voltage clamp in FIGS. 1 and 3; and FIG. 8 is a block diagram of the pulsewidth modulators.

DETAILED DESCRIPTION

Figure 1:
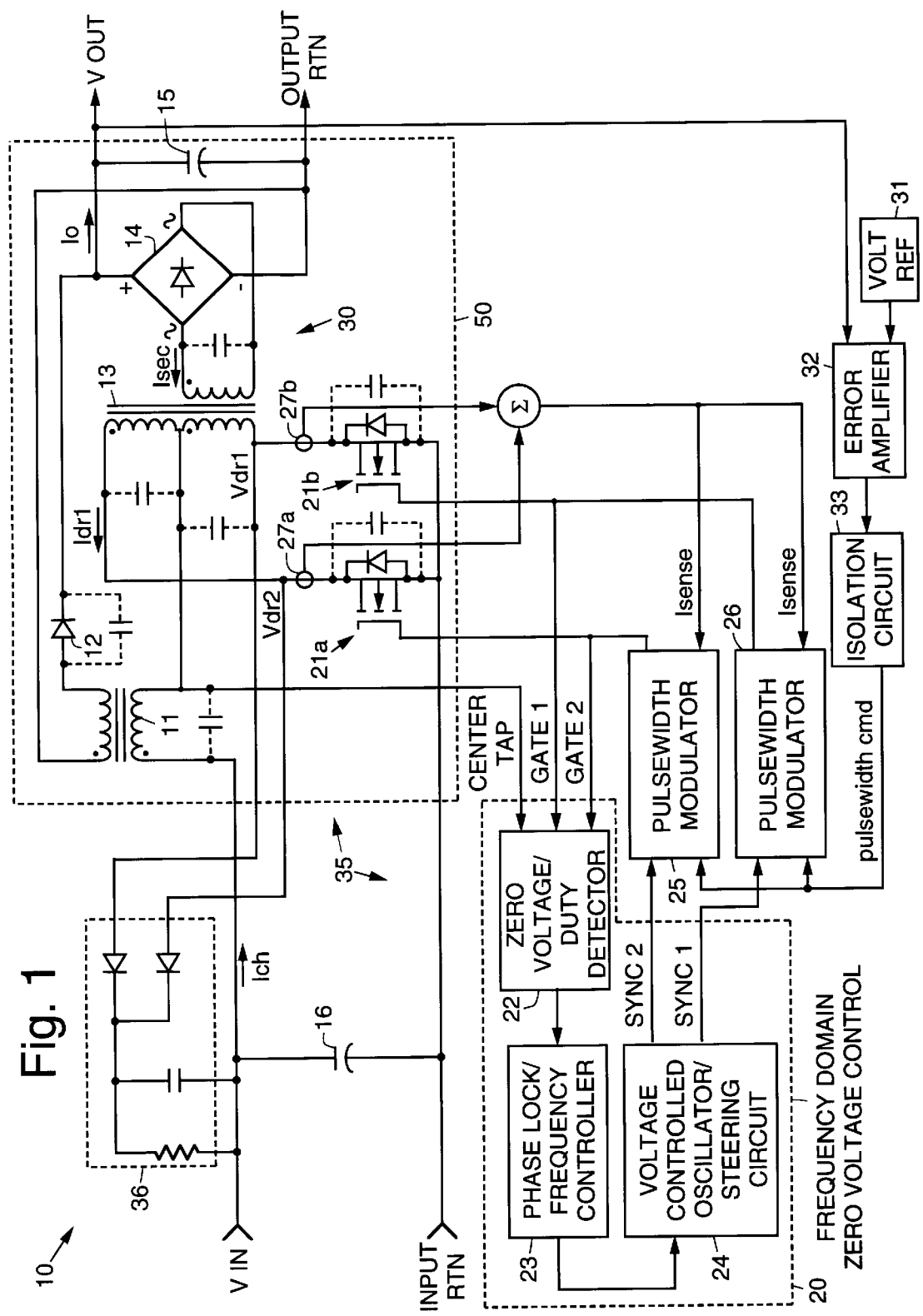
FIG. 1 illustrates a simplified schematic of a first embodiment of a zero voltage switching boost converter in accordance with the principles of the present invention employing a phase-locked loop approach.

Referring to the drawing figures, FIG. 1 illustrates a simplified schematic of a first embodiment of a zero voltage switching boost converter 10 in accordance with the principles of the present invention employing a phase-locked loop approach. The zero voltage switching boost converter 10 comprises a voltage amplifying stage 50 comprising first and second switching transistors 21a, 21b, an input coupled inductor 11, and an output transformer 13 having a center tap. The voltage amplifying stage 50 amplifies a DC input voltage to produce a higher DC output voltage, greater than the product of the input voltage and the turns ratio of the output transformer 13. The voltage amplifying state 50 can also supply power at lower voltages by operating as a conventional Weinberg converter.

A zero voltage control input circuit 20 is coupled to gates of the first and second switching transistors, and to the center tap of the output transformer 13. The zero voltage control input circuit 20 generates synchronization signals that synchronizes the rising edge of the gate drive signals applied to the switching transistors 21a, 21b with a resonant circuit 30 by observing the state of gate and drain voltages of the switching transistors 21a, 21b and detecting the moment when both drains are low, but both gates are not high.

First and second pulsewidth modulators 25, 26 are coupled to current sensors 27a, 27b that sense current flowing through the switching transistors 21a, 21b along with the outputs of the input control circuit 20 and the isolation circuit 30. The pulsewidth modulators 25, 26 generate gate drive signals that drive the gates of the first and second switching transistors 21a, 21b in response to the synchronization signals generated by the zero voltage control input circuit 20, sensed current and the pulsewidth command signal from the isolation circuit 30.

More particularly, the first embodiment of the zero voltage switching boost converter 10 shown in FIG. 1 comprises a voltage input and input voltage return filtered by means of an input filter capacitor 16. The voltage input is coupled through a primary winding of the input coupled inductor 11 to a center tap of the output transformer 13 and to an input of a zero voltage/duty detector 22.

One side of the secondary of the input coupled inductor 11 is coupled through a diode 12 to provide a portion of the output current of the boost converter 10. The other side of the secondary of the input coupled inductor 11 is coupled to the high voltage output return line of the boost converter 10. The secondary of the output transformer 13 is coupled to the output rectifiers 14. An output filter capacitor 15 is coupled across the high voltage output of the boost converter 10.

The boost converter 10 is controlled by the input control circuit 20 the error amplifier 32, voltage reference 31 isolation circuit 33, and first and second pulsewidth modulators 25, 26, and current sensors 27a, 27b. The input control circuit 20 comprises the zero voltage/duty detector 22, a phase lock/frequency controller 23, a voltage controlled oscillator and steering circuit 24.

Each side of the primary winding of the output transformer 13 is coupled to a drain of the first and second transistors 21a, 21b. The gate of each transistor 21 is coupled to inputs of the zero voltage/duty detector 22 and to outputs of the current mode pulsewidth modulators 25, 26. The center tap of the output transformer 13 is coupled to an input of the zero voltage/duty detector 22. Sources of each transistor 21a, 21b are coupled to the input voltage return. The first and second sensors 27a, 27b sense current passing through the respective transistors 21a, 21b. Outputs of the first and second sensors 27a, 27b are summed and coupled to respective current inputs of the first and second pulsewidth modulators 25, 26.

The output of the zero voltage/duty detector 22 is coupled to the phase lock/frequency controller 23. The output of the phase lock/frequency controller 23 is coupled to the voltage controlled oscillator and steering circuit 24. First and second synchronization signals (sync 1, sync 2) are output by the voltage controlled oscillator and steering circuit 24 and are applied to inputs of the pulsewidth modulators 25, 26.

The high voltage output of the boost converter 10 is applied to a first input of the error amplifier 32 along with the output of a voltage reference 31. The output of the error amplifier 32 is input to the isolation circuit 33 which produces a pulsewidth command output (pulsewidth cmd) that is output to the pulsewidth modulators 25, 26.

The zero voltage switching boost converter 10 is a current fed push-pull circuit wherein conduction of the transistor switches 21a, 21b of the input control circuit 20 overlaps. This is known as a Clark converter. The boost converter 10 can be made to self resonate by setting the magnetizing inductance of the output transformer 13 to an appropriate value. As an alternative, a separate inductor may be connected across the primary winding of the output transformer 13 to set the inductance to the value needed. The resonant frequency changes with power output, so the phase-locked loop circuit 35 or other active circuit is needed to synchronize the switching transistor 21a, 21b with the resonant circuit 30.

Figure 2:
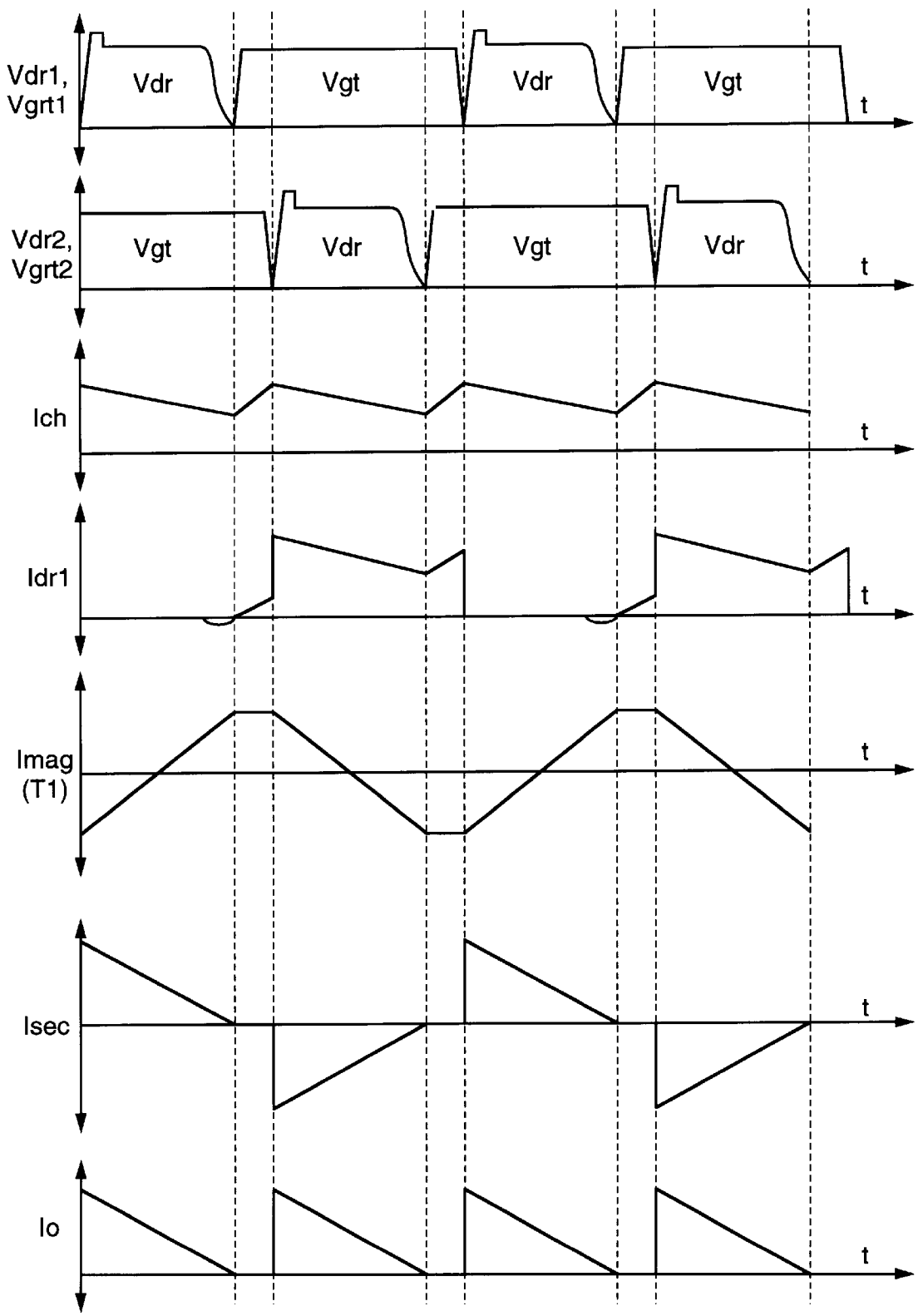
FIG. 2 illustrates switching waveforms of the zero voltage switching boost converter shown in FIG. 1.

The switching waveforms of the zero voltage switching boost converter 10 are shown in FIG. 2. The top waveform shows drain and gate voltages of the first transistor 21a. When the first transistor 21a is turned off, there is a leakage transient, then the drain voltage settles to the output voltage of the converter 10 reflected because of the turns ratio the output transformer 13. During this period, power is delivered to the converter output filter capacitor 15 as shown by the lo waveform.

The output transformer 13 secondary current (Isec) is the difference between the choke current (reflected to the output through the turns ratio of the output transformer 13) and the magnetizing current of the output transformer 13. As the magnetizing current increases, the output current of the output transformer 13 ramps down to zero, causing the output rectifiers 14 to cease conducting and the drain voltage of the transistors 21a, 21b to collapse.

The drain voltages collapse to zero if the following inequality is satisfied:

Vout>(2*Nsecondary*Vin*Lxfmr)/(Nprimary* (Lxfmr*Linductor)), where Vout is the output voltage of the converter 10, Vin is the input voltage of the converter 10, Nsecondary is the number of turns in the secondary of the output transformer 13, Lxfmr is the magnetizing inductance of the primary of the output transformer 13 (center tap to end), Nprimary is the number of turns the primary of the output transformer 13 (center tap to end), and Linductor is the inductance of the primary of the input coupled inductor 11. After the drain voltage reaches zero, the gate voltage is driven high. This is the zero voltage switching event. While both gates are on, the current in the inductor input current (Ich) ramps up. This period corresponds to the switch on-time in a conventional boost converter.

The current in each switching transistor 21a, 21b is present for more than 50 percent of the cycle, which minimizes $I^2R$ loss in the transistors 21a, 21b, when compared to buck-derived zero voltage switching converters (Idr1 waveform). The switch overlap period ends when the gate voltage of the second transistor 21b goes low, beginning another period of conduction to the output. The gate voltages are synchronized to the drain voltages using the phase-locked loop circuit 35, as shown in FIG. 1, or using a time domain technique as is illustrated by the boost converter 10 shown in FIG. 3.

The boost converter 10 of FIG. 2 employing the phase locked loop approach has been reduced to practice to prove out the principles of the present invention. Test results show an efficiency of 95.5 percent, compared to 94 to 94.3 percent for a conventional hard switching converter in an identical application The reduced to practice boost converter converts 100 V to 300V at approximately 1500 watts output.

At lower power levels, it operates with higher efficiency and lower stress on the switching transistors than the converter employing the time domain control approach.

Figure 3:
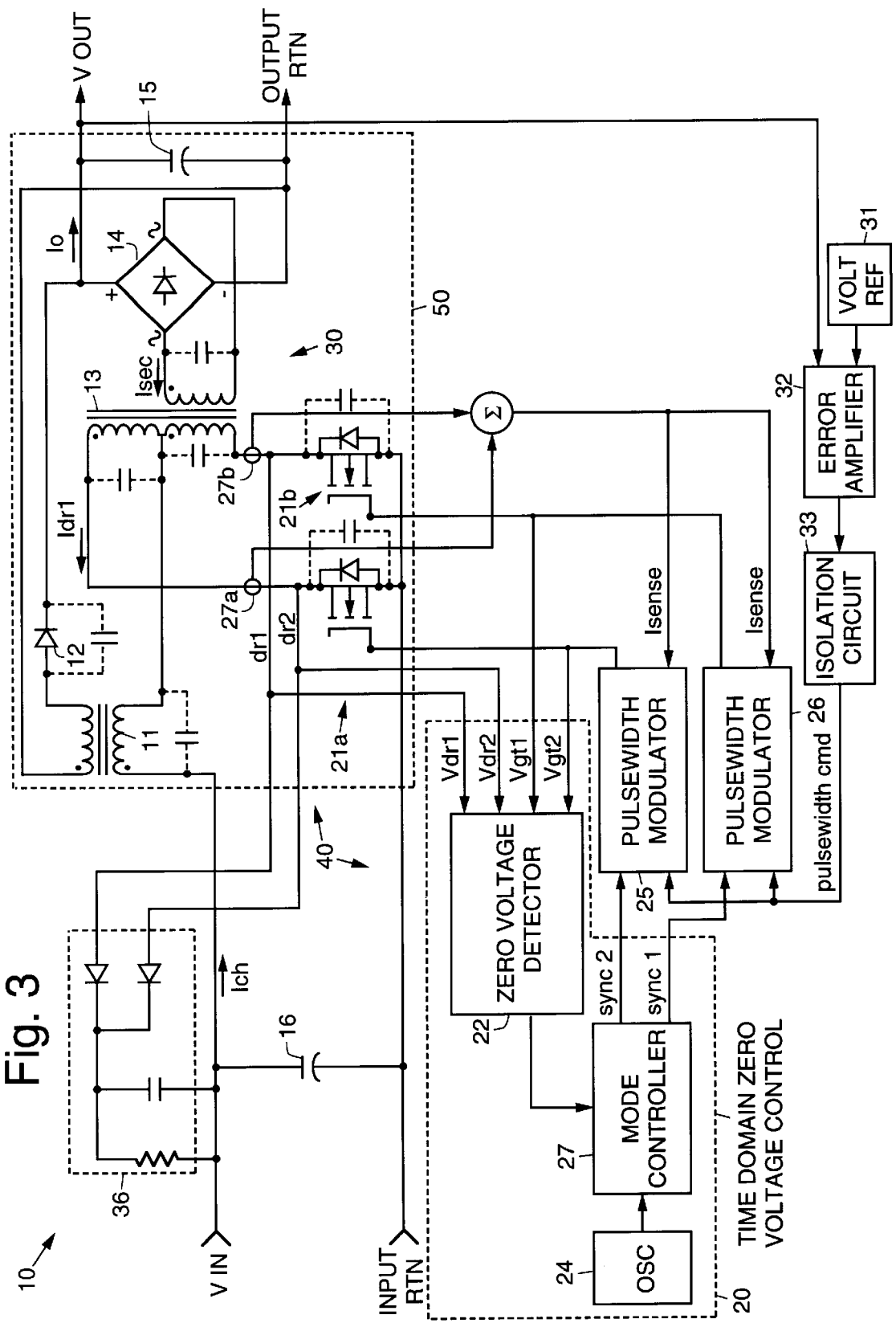
FIG. 3 illustrates a simplified schematic of a second embodiment of a zero voltage switching boost converter in accordance with the principles of the present invention employing a time domain approach.

Referring to FIG. 3, it illustrates a simplified schematic of a second embodiment of a zero voltage switching boost converter 10 employing the time domain approach. The second embodiment of the zero voltage switching boost converter 10 is similar to the embodiment described above, but the phase-locked loop circuit 35 is replaced by a time domain circuit 40. The time domain circuit 40 comprises a zero voltage detector 22, an oscillator 24, and a mode controller 27.

The boost converter 10 of FIG. 3 employing the time domain approach has also been reduced to practice to prove out the principles of the present invention. Test results show similar results to those obtained with the phase locked loop approach at maximum output power.

The conventional Weinberg (buck) converter has a somewhat similar power stage compared to the zero voltage switching boost converter 10. One difference between the two circuits is the transformer and coupled inductor turns ratios. The zero voltage switching boost converter 10 has a transformer turns ratio less than the voltage conversion ratio, and operates in buck mode during power-up, because the output voltage is initially zero. Furthermore, the zero voltage switching boost converter 10 requires tightly coupled magnetics to achieve high efficiency, because its leakage transients are limited by the dissipative voltage clamp circuit 36. A lossless clamp, such as is shown in FIG. 7, may also be used. The points labeled "dr1", "dr2", "Vin", and "INPUT RTN" in FIG. 7 correspond to the same points in FIGS. 1 and 3.

The zero voltage switching boost converter 10 synchronizes the drive signal applied to the switching transistors 21a, 21b with the resonant circuit 30 by observing the state of the gate and drain voltages and detecting the moment when both drains are low, but both gates are not high. In the phase-locked loop approach used in the boost converter 10 shown in FIG. 1, the frequency is adjusted so that both drains are low for a short time before the inactive gate is turned on. The frequency domain zero voltage control circuit 20 performs this function, and details of the frequency domain zero voltage control scheme used in the boost converter 10 of FIG. 1 are shown in FIG. 4.

Figure 4:
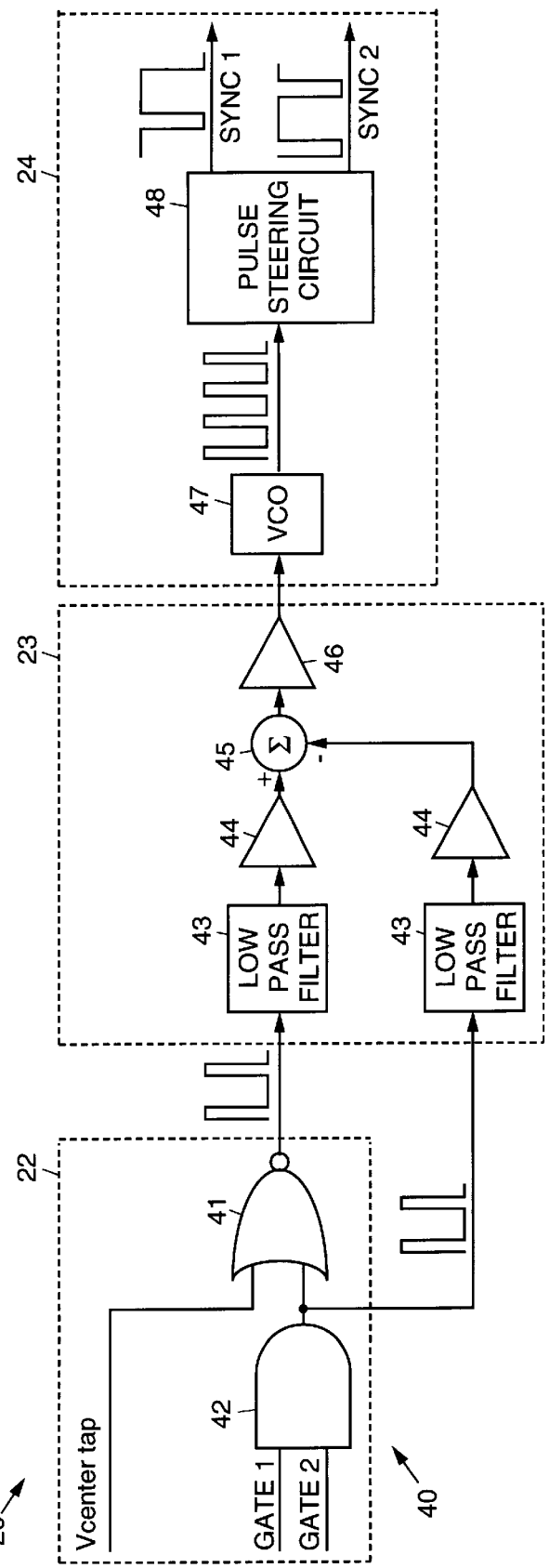
FIG. 4 is a detailed block diagram of the frequency domain zero voltage control scheme used in the boost converter of FIG. 1.

Referring to FIG. 4, the frequency domain zero voltage switching control scheme provided by the input control circuit 20 is as follows. The input control circuit 20 comprises a logic network 40 including a NOR gate 41 and an AND gate 42. Outputs of the NOR gate 41 and AND gate 42 are filtered by first and second low pass filters 43, weighted by first and second weighting amplifiers 44, and summed by a summer 45. The summed output of the summer 45 is compared to an ideal value and amplified by a compensating amplifier 46 whose output drives the voltage controlled oscillator (VCO) 47. The output of the voltage controlled oscillator 47 is input to a pulse steering circuit 48 which outputs synchronization signals (sync1, sync2), which are phased 180 degrees apart.

The sync1 and sync2 signals are fed to the inputs of the pulsewidth modulators 25,26, which are shown in detail in FIG. 8. Referring to FIG. 8, a sync signal is coupled to the set input of a flip-flop 61. The Isense input is coupled to a summer 62, along with the output of a ramp generator 63. The sum of these two signals is coupled to a comparator 64 along with the pulsewidth cmd signal. The output of the comparator 64 is coupled to a reset input of the flip-flop 61. The output of the flip-flop 61 is coupled to the ramp generator 63. which produces a ramp that begins when the output of the flip-flop 61 changes to the high state. When a sync signal is received, the output of the pulsewidth modulator 25, 26 changes to the high state. The ramp signal begins to rise, along with the Isense signal from the current sensors 27a, 27b. When the sum of these signals exceeds the pulsewidth cmd signal, the output is reset to a low state.

The power stage of the converter 10 ideally operates in a mode in which the switching transistors 21a, 21b are driven on just as the voltage across them resonates to zero. However, at high input voltages and/or light loads, the converter 10 operates at higher frequency and shorter duty ratio, which results in a shorter on-time for the switching transistors 21a, 21b. In these operating modes, it is desirable to force the switching transistors 21a, 21b on before the voltage across them has resonated completely to zero. This prevents the converter 10 from operating with both switching transistors 21a, 21b off during part of the switching cycle, which would produce higher voltages across the switching transistors 21a, 21b. The frequency domain control circuit 20 compromises between the requirement to keep at least one switching transistor 21a, 21b on at all times, and the ideal operation in which the switching transistors 21a, 21b turn on just after the collapse of the drain voltage.

Digital signals, which represent the state of the gates of the switching transistors 21a, 21b and the center tap of the output transformer 13, are fed to the logic network 40. The center tap voltage of the output transformer 13 is a convenient place to sense the state of the drains of the switching transistors 21a, 21b. When its state is zero, both drain voltages must also be zero, due to the coupling of the transformer windings.

The AND gate 42 provides a signal that is high when both gate voltages are high, and low otherwise. This signal is fed to the NOR gate 41, along with the transformer center tap signal. The output of the NOR gate 41 is high when the center tap voltage is zero, but both gates are not driven on. This occurs when the converter 10 has resonated to a state in which the voltage across both switching transistors 21a, 21b is zero, but both switching transistors 21a, 21b are not driven on.

The output of the NOR gate 41 is filtered by the first low pass filter 43 to produce a DC signal that is proportional the percentage of each cycle during which this state exists. This signal represents the phase lag between the fall of the drain voltages and the rise of the gate voltages, which is ideally regulated at a low positive value.

The second low pass filter 43 derives a signal proportional to the percentage of each cycle in which both gate voltages are high, indicating that both switching transistors 21a, 21b are driven on. This is ideally regulated to maintain a minimum positive value, indicating that there is a minimum portion of the cycle when both switching transistors 21a, 21b are on. This insures that there is no time when both switching transistors 27a, 27b are off.

The two DC signals are multiplied by the weighting amplifiers 44 and combined by the summer 45 with the polarities as indicated in FIG. 4. The compensating amplifier 46 compares the combined signal to its ideal value, and adjusts the control signal to the voltage controlled oscillator 47 to maintain the converter 10 at an operating frequency that is a close to ideal zero voltage switched operation as possible at the prevailing input voltage and output current.

Figure 5:
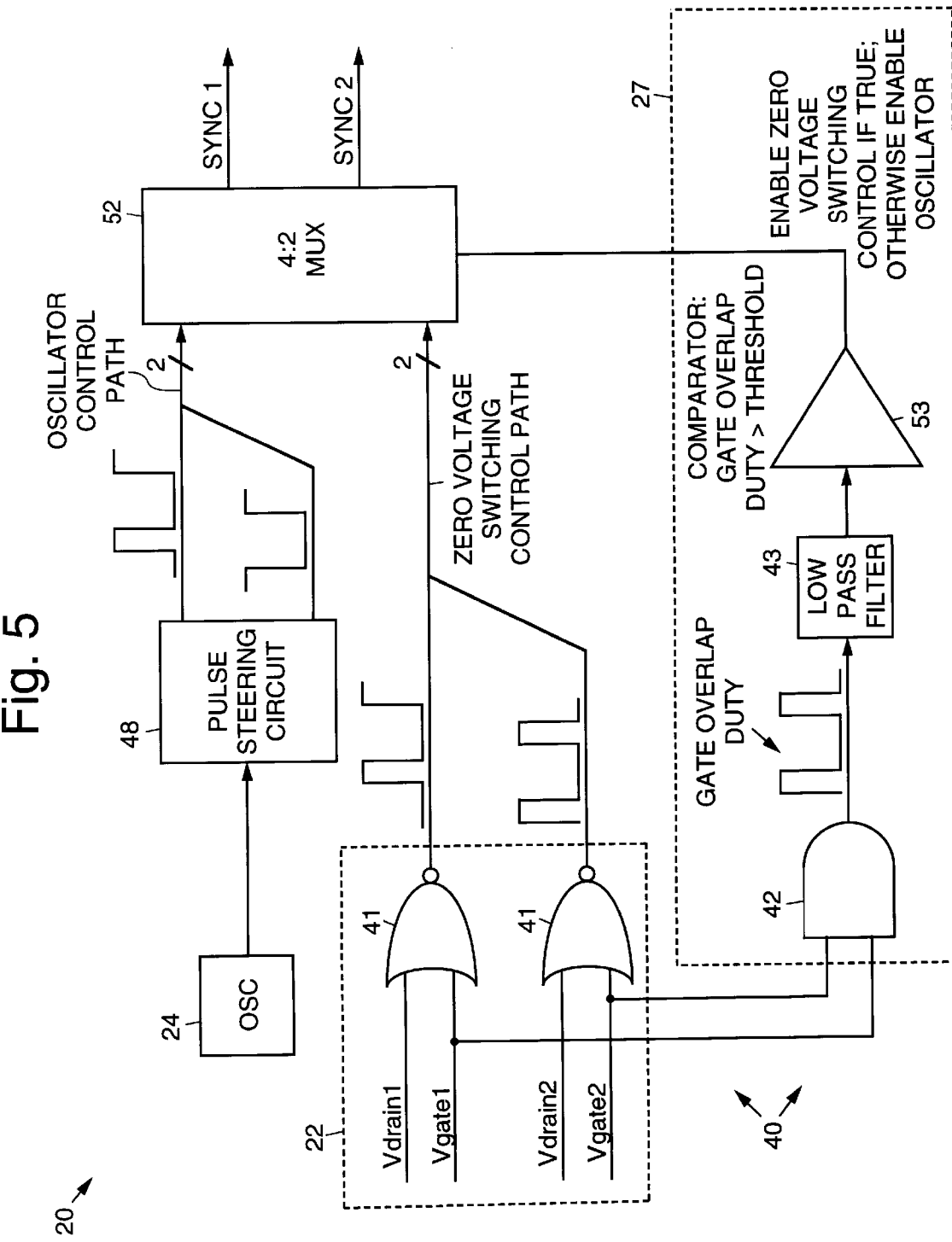
FIG. 5 is a detailed block diagram of the time domain zero voltage control scheme used in the boost converter of FIG. 3.

In the time domain approach used in the boost converter 10 shown in FIG. 3, the switching transistor 21a, 21b that is off is triggered on when its drain voltage is low but its gate voltage is not high, causing the converter 10 to self-oscillate at its resonant frequency. The zero voltage switching boost converter 10 using the time domain approach is force oscillated at start-up and when it is in buck mode. FIG. 5 is a detailed block diagram of the time domain zero voltage control scheme used in the boost converter 10 of FIG. 3.

Referring to FIG. 5, the time domain zero voltage switching control scheme provided by the input control circuit 20 is as follows. The input control circuit 20 comprises the oscillator (OSC) 24 that drives a pulse steering circuit 48 which outputs two oscillator control signals phase 180 degrees apart. The oscillator control signals are input to a 4:2 multiplexer (MUX) 52 that implements the mode controller 27. As in the frequency domain approach, the sync 1, sync 2 signals control the timing of the rise of the gate voltages. The fall of the gate voltages is controlled by the pulsewidth modulators 25, 26, based on the feedback signal from the isolation circuit 33 and the current sense signals.

A logic network 40 includes first and second NOR gates 41 and an AND gate 42. The first NOR gate 41 receives drain and gate voltages derived from the first switching transistor 21a while the second NOR gate 41 receives drain and gate voltages derived from the second switching transistor 21b. The respective gate voltages from the switching transistors 21a, 21b are input to the AND gate 42.

The outputs of the first and second NOR gates 41 comprise zero voltage switching control signals that are input to the 4:2 multiplexer 52. The output of the AND gate 42 comprises a gate overlap duty signal that is filtered in a low pass filter 43, and input to a comparator 53. The comparator 53 outputs a control signal when the gate overlap duty signal is greater than a predetermined threshold. The control signal determines the two-input signals selected by the 4:2 multiplexer 52.

The input control circuit 20 comprises an internal clock (oscillator 24) to force oscillate the converter 10 at start-up and in abnormal operating conditions such as during an overload. In operating conditions in which zero voltage switching is possible, the input control circuit 20 generates signals or synchronization pulses (sync1, sync2) by applying logic signals analogous to the drain and gate voltages of the switching transistors 21a, 21b to the first and second NOR gates 41. The outputs of the NOR gates 41 are high when both inputs are low, indicating that the drain has resonated to zero volts without voltage having been applied to the gate. The input control circuit 20 switches between the two modes based on the portion of the cycle in which both gates are high. This is the duty ratio of the boost converter 10. A DC signal proportional to the duty ratio is derived by applying the gate signals to the AND gate 42 and averaging the resulting pulse train with the low pass filter 43. If it is above the threshold set by the comparator 53, the multiplexer 52 enables the zero voltage switching control signal path. Otherwise, it enables the oscillator control path.

Figure 6A:
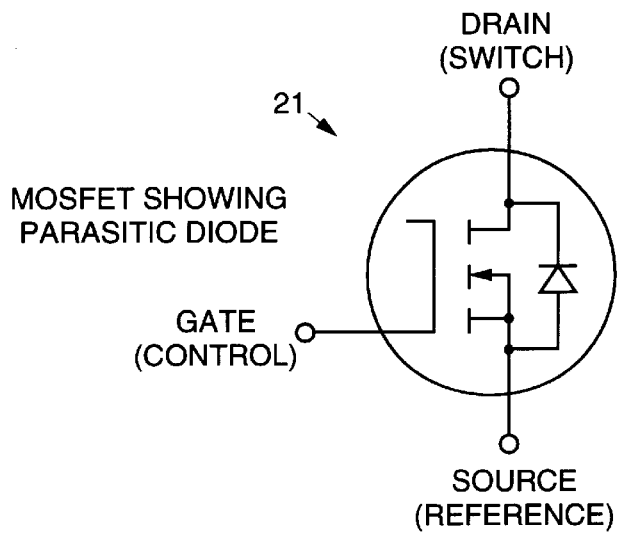
FIG. 6 illustrates alternative switching devices that may be used in place of the MOSFETs shown in FIGS. 1 and 3.
Figure 6B:
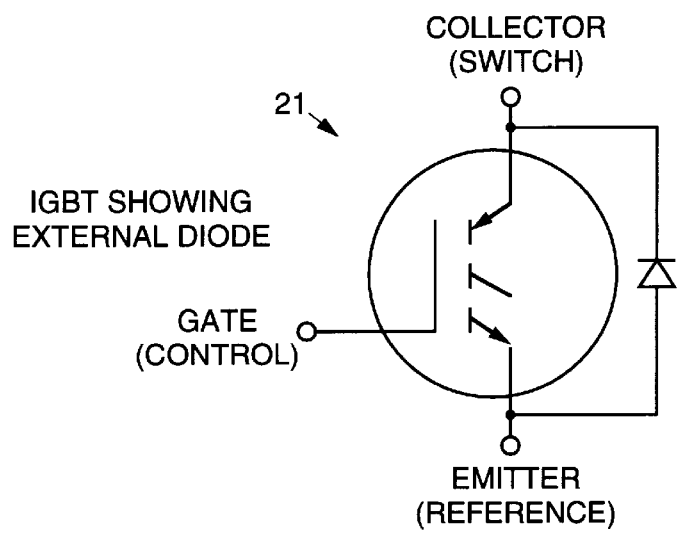
Figure 6C:
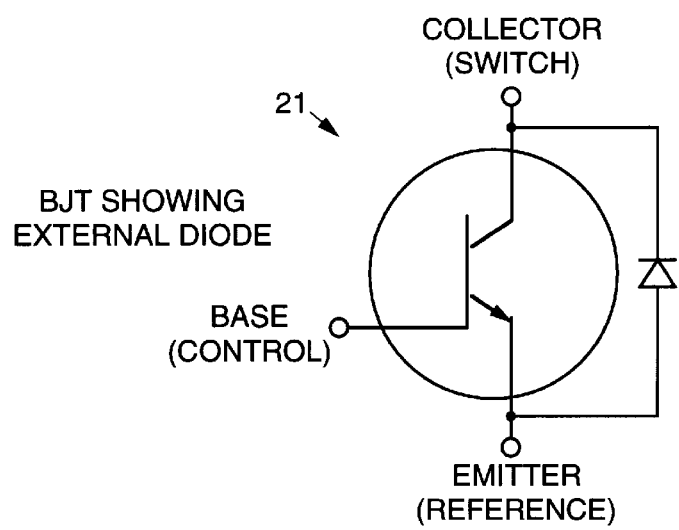

Although MOSFETs are shown as the switching devices in the drawing figures, other types of transistors or thyristors may be used. Referring now to FIG. 6, it illustrates alternative switching devices that may be used in place of the MOSFET devices shown in FIGS. 1 and 3. Such devices include, but are not limited to, IGBTs (Insulated Gate Bipolar Transistors), BJTs (Bipolar Junction Transistors) or gate turnoff thyristors (GTOs). These devices require an anti-parallel diode, unlike the MOSFETS shown, which incorporate this device as a parasitic element.

Thus, improved zero voltage switching isolated boost converters have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A zero voltage switching isolated boost converter comprising:

a voltage amplifying stage comprising first and second switching transistors, an input coupled inductor, an output transformer, and output rectifiers, for amplifying a DC input voltage to produce a DC output voltage higher than the product of the input voltage and the turns ratio of the output transformer, and supply output current at lower output voltages when operating as a buck converter;

a zero voltage control input circuit coupled to gates and drains of the first and second switching transistors for generating synchronization signals that synchronize the rising edges of the gate drive signals applied to the switching transistors with a resonant circuit by observing the state of gate and drain voltages of the switching transistors and detecting the moment when both drains are low, and both gates are not high; and first and second pulsewidth modulators coupled to the gates of the first and second switching transistors for generating the gate drive signals that drive the gates of the switching transistors in response to the synchronization signals generated by the zero voltage control input circuit, current sense signals generated by current sensors and the pulsewidth command signals generated by the error amplifier and isolation circuit.

2. The boost converter recited in claim 1 wherein:

the input coupled inductor has a primary winding for receiving an input voltage, and a secondary winding for delivering current to the output during buck operation;

the output transformer has a primary winding with a center tap, and a secondary winding, and wherein the first and second transistors are coupled to the primary winding of the output transformer; and output rectifiers are coupled to the secondary winding of the output transformer that produces the DC output voltage from the boost converter.

3. The boost converter recited in claim 1 wherein the zero voltage control input circuit comprises:

a zero voltage/duty detector for detecting gate and drain voltages of the switching transistors;

a phase lock/frequency controller coupled to the detector for controlling the operating frequency;

a voltage controlled oscillator and steering circuit coupled to the controller for generating the synchronization signals.

4. The boost converter recited in claim 3 further comprising:

a voltage reference;

an error amplifier coupled to the boost converter and to the voltage reference for feedback of the output voltage for voltage regulation; and an isolation circuit coupled between the error amplifier and the pulsewidth modulators for coupling the error amplifier output to the pulsewidth modulators for output voltage regulation.

5. The boost converter recited in claim 1 wherein the zero voltage control input circuit comprises:

a zero voltage switching detector for detecting the state of gate and drain voltages of the switching transistors;

an oscillator; and a mode controller coupled to the zero voltage detector and the oscillator, for generating the synchronization signals.

6. The boost converter recited in claim 5 further comprising:

a voltage reference;

an error amplifier coupled to the boost converter and to the voltage reference for feedback of the output voltage for voltage regulation; and an isolation circuit coupled between the error amplifier and the pulsewidth modulators for coupling the error amplifier output to the pulsewidth modulators for output voltage regulation.

7. The boost converter recited in claim 1 wherein the zero voltage control input circuit comprises:

an oscillator;

a pulse steering circuit coupled to the oscillator that outputs oscillator control signals;

a multiplexer for receiving the oscillator control signals;

a logic network for processing drain and gate voltage signals derived from the switching transistors to generate zero voltage switching control signals that are input to the multiplexer, and generate a multiplexer control signal that controls the multiplexer to selectively output synchronization signals that are a function of the oscillator control signals or the zero voltage switching control signals.

8. The boost converter 1 recited in claim 7 wherein the oscillator force oscillates the converter at start-up and in abnormal operating conditions.

9. The boost converter recited in claim 1 wherein the first and second pulsewidth modulators are respectively coupled to first and second sensors that sense current flowing through the first and second transistors, and in which a ramp is added to the current sense signal to cause the transistor which has been on the longest to turn off first.

10. The boost converter recited in claim 1 wherein the first and second pulsewidth modulators are coupled to the zero voltage control circuit which supplies synchronization signals to control the timing of the rising edge of the gate drive signal.

* * * * *